UNITED STATES PATENT OFFICE.

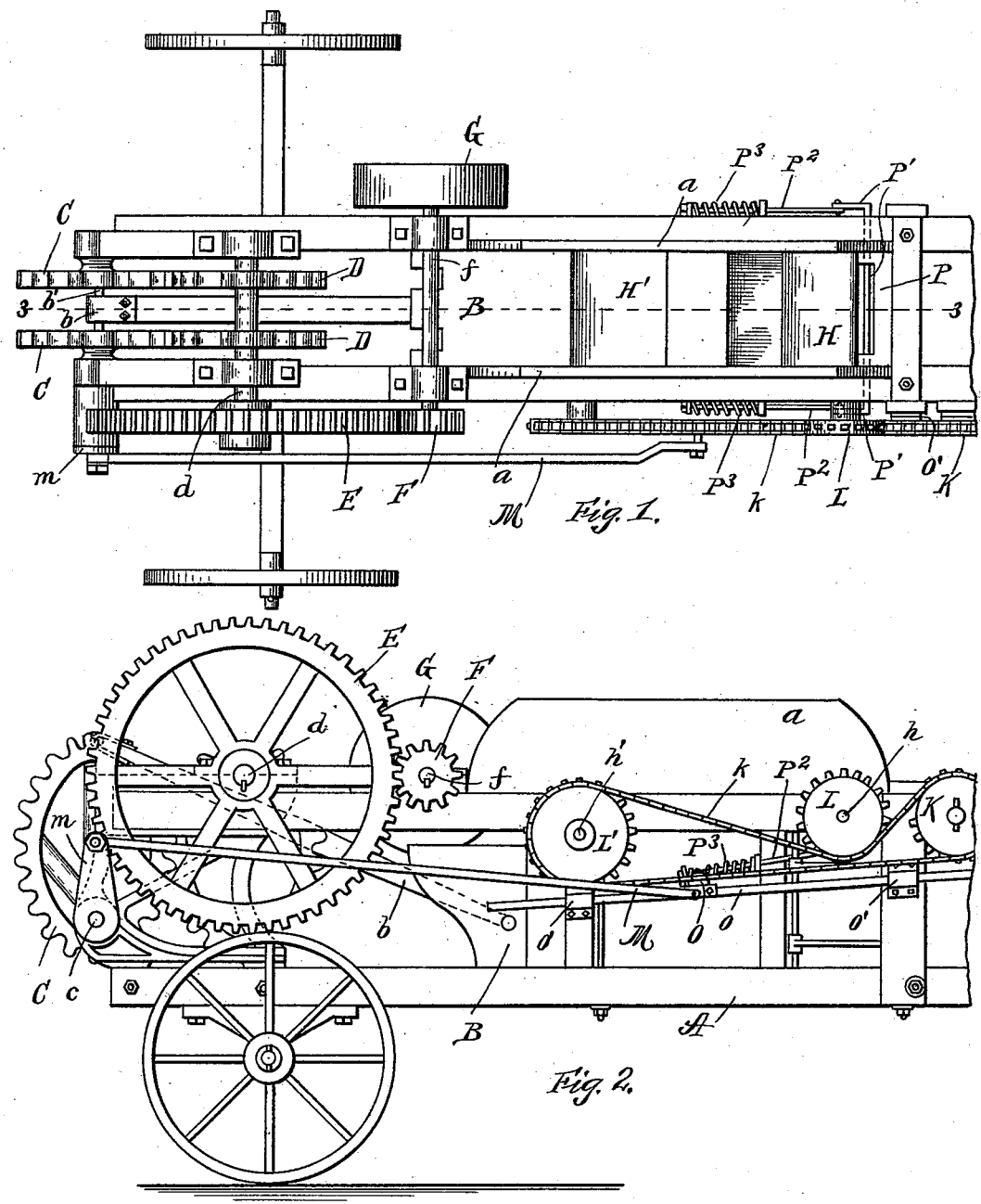

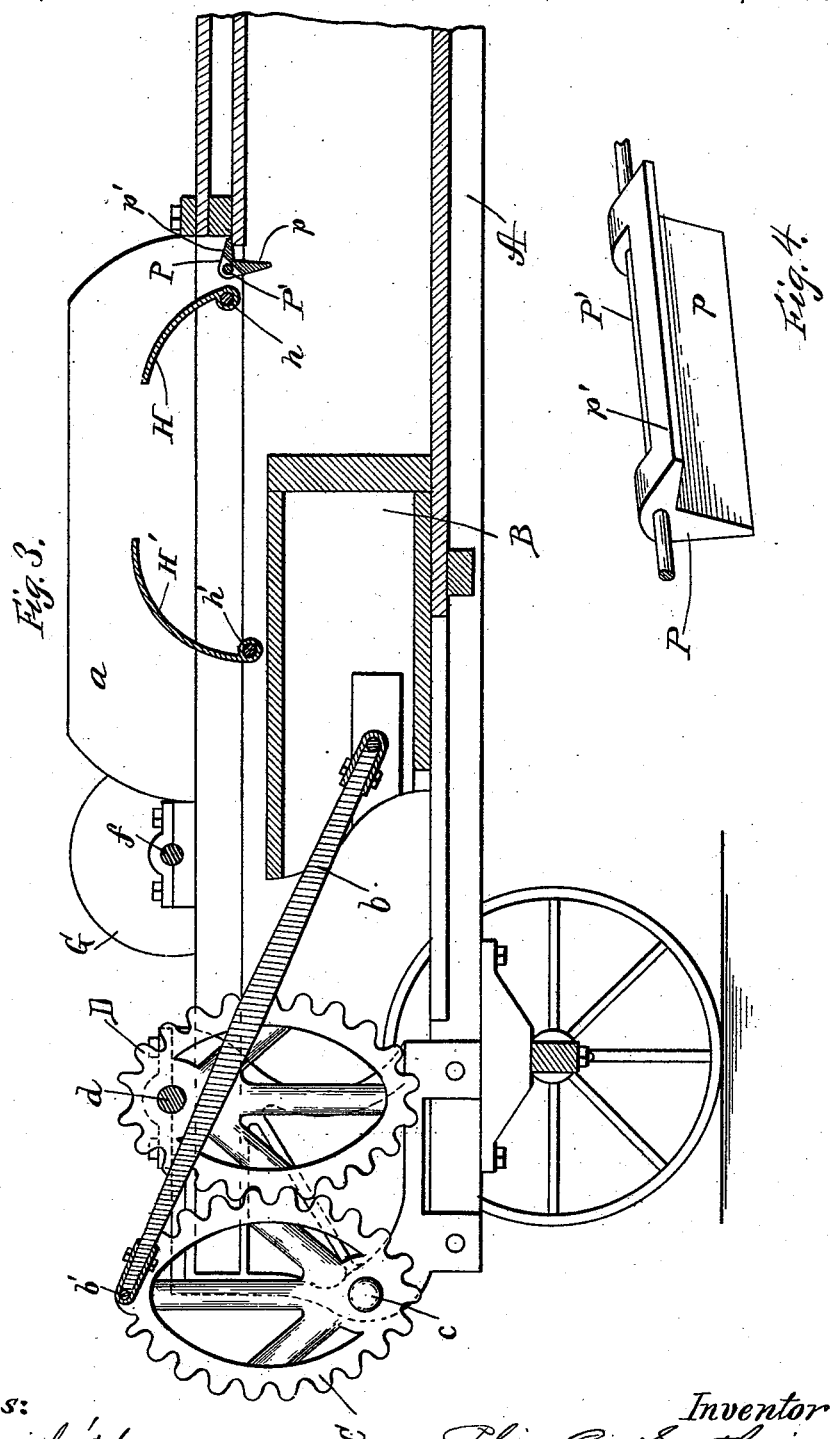

PLIN C. SOUTHWICK, OF SANDWICH, ILLINOIS.

BALING-PRESS.

SPECIFICATION forming part of Letters Patent No. 534,291, dated February 19, 1895.

Application filed June 11, 1894. Serial No. 514,261. (No model.)

*To all whom it may concern:*

Be it known that I, PLIN C. SOUTHWICK, a citizen of the United States, residing at Sandwich, in the county of De Kalb and State of Illinois, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of baling presses, chiefly used in baling hay, in which a plunger reciprocates in a closed body or compression chamber, into which, through an opening in its side the loose hay is fed, and from the open end of which the bales are forced by the action of the plunger.

The improvement forming the subject of this application relates directly to the means for actuating the plunger and feeding plates used in forcing the loose hay into the compression chamber, its object being to secure a construction that great power is available at the end of the stroke of the plunger when the greatest work is done, while obtaining a long stroke for the plunger and quick action as it recedes and advances.

A further object is to improve the form of the bale by preventing the hay from hanging out from its upper side.

The invention consists in the use of elliptic gears for communicating power to the plunger and in such a construction of the mechanism for actuating the feeders that the hay is tucked under the folder and a smooth surface of the bale secured.

The body of the press being the same as is commonly used I have shown in the drawings only that portion of it to which the improvements pertain.

Figure 1, is a plan view of the press. Fig. 2, is a side elevation of the same. Fig. 3, is a vertical longitudinal section on the line 3—3 of Fig. 1. Fig. 4, is a perspective of the folder.

The frame or body of the press is shown at A, and is oblong rectangular in form and mounted upon running gear for convenience in transportation. In the top of the body there is an opening for the reception of loose hay, and wings, $a$, extend upwardly at each side thereof, to facilitate the feeding. The compressing plunger, B, reciprocates within the body, A, across and beyond the feed opening, forcing the loose hay into the closed portion of the body in the usual manner.

A folder, P, is pivotally hung across the top of the compression chamber, immediately forward of the feed opening and consists of two leaves, $p$, $p'$, rigid as to each other and inclosing an angle of approximately forty-five degrees. The shaft, P', carrying the folder, projects beyond the walls of the body, A, and is bent to form cranks to which are connected pitmen, $P^2$, controlled by retracting springs, $P^3$, attached to the body side and tending to draw the folder back after it has been pushed forward by the plunger and hay.

Power is communicated to the plunger, B, by means of a pitman, $b$, attached to a crank-pin, $b'$, set between a pair of elliptic gears, C, C, which are mounted in parallel planes upon stud shafts, $c$, journaled at the bottom and at the extreme rear end of the body, A. A second pair of elliptic gears, D, D, mounted upon a shaft, $d$, journaled at the top of the body, A, and a little forward of the journals of the shafts, $c$, mesh with and drive the gears, C, C. The shaft, $d$, projects beyond one side of the body, A, and carries a gear wheel, E, which meshes with the pinion, F, mounted upon a shaft, $f$, which carries the belt pulley, G, by means of which power is communicated to the press from any desired form of motor, not shown. The crank pin, $b'$, is located at the extreme end of the longest radius of the gears, C, C, being set in a pair of their teeth, which are made larger than their fellows to provide ample strength, the gears, D, D, being provided with a correspondingly enlarged space at their shortest radius to receive this enlarged tooth. The two pairs of elliptic gears are so adjusted, relatively, that the long radius of the gears, C, C, and the short radius of the gears, D, D, coincide, the speed of the plunger being at its minimum and the power exerted at its maximum, as the plunger reaches the limit of its forward movement and hence is just finishing the compression of the hay before it. During the recession of the plunger and the first part of its advance the movement is very quick, the long end of the gears D, D, and the short end of the gears C, C, coming into action. By this construction the plunger is given a long range of travel, equal to twice the long radius of the gears C, C, while having the advantage in power during that portion of its cycle in which the greatest pressure is required, of a crank arm equal to the shortest radius of the gears D, D. The severest strain is borne by the short end of the gears D, D, as the effect of locating the crank-pin, b', in a pair of the teeth of the gears, C, C, is to practically transfer it to the gears D, D, as it passes them, the pressure being conveyed directly from these gears to the pitman, b, and not through the body of the gears C, C.

By using at F, a pinion of much less diameter than the belt pulley, G, and at E a large gear, there is great gain of power, with of course a corresponding loss of speed and shortening of travel, both at the transfer from the shaft, f, to the shaft, d, and at the transfer from the latter shaft to the pitman, b, through the short end of the gears D, D, while the use of the elliptic gears recovers the long movement of the plunger and its high speed while doing but little work, making it possible to concentrate this great multiplication of power at that point of the cycle of the plunger at which there is the greatest resistance to overcome.

Curved pressing or feeding plates, H, H', are carried by rock shafts, h, h', respectively located at the ends of the feed opening and carrying sprocket wheels, I, I', outside of the body A. A third sprocket wheel, K, is mounted upon a stud shaft set in the same side of the body, A, and a sprocket chain, k, is carried by the wheels, I, K, and its upper turn passes under the wheel I, so that the action of the chain rotates the wheels I, I', in opposite directions. A reciprocating movement is communicated to the chain, k, by means of a pitman M, driven by a crank arm, m, mounted upon one of the stud shafts, c. Connection between the pitman M, and the chain k, is through a block, O, attached to a slide bar, o, carried by loops o', o', secured to the side of the body, A.

The reciprocation of the pitman M, causes the feeding plates H, H', to rise and fall and the movement is so timed that they are elevated as the plunger advances. Hay is thrown upon the top of the advancing plunger and as it recedes the plates H, H' descend and reach the limit of their downward movement when the plunger is fully withdrawn, the hay being thereby forced in front of it. The wheel I is smaller than the wheel I', so that the plate H travels through a longer arc than the plate H' and forces the hay well under the folder P.

The plunger and feed plates both being driven by elliptic gears, their speed is variable. The crank arm m, projects in the direction of the longest radius of the gears C, C, so that the movement of the feed plates is slowest while they are open, allowing ample time for charging the press. Their movement as they enter and recede from the feed opening is very quick, so that the hay is forced into the chamber of the press and the plates are withdrawn in time to escape the advancing plunger.

I claim as my invention—

1. The combination in a baling press, of a plunger, a pitman for actuating the plunger, a pair of elliptic gears, C, C, stud shafts for carrying the gears, a crank pin extending between the gears for driving the pitman the pin being located at the outer end of the longest radius of the gears, a pair of elliptic gears D, D, for driving the gears, C, C, journaled between said last named gears and the plunger and means for applying power to the gears D, D, substantially as described.

2. The combination in a baling press, of a plunger, an elliptic gear C, a stud shaft for carrying the gear, a crank pin set in the gear at the outer end of its longest radius, a pitman connecting the crank pin and the plunger, an elliptic gear D, for turning the gear C, and journaled between said last named gear and the plunger.

3. The combination in a baling press, of a plunger, two pairs of twin elliptic gears for driving the plunger, a crank pin extending between one pair of such gears and being on its longest radius and set in a pair of the teeth of such gears, and a pitman leading from the crank pin to the plunger, substantially as described.

4. The combination in a baling press of a plunger, means for driving the plunger, a folder for forming the top of the bale, a pair of feeding plates H, H', rock shafts for carrying the plates and means for rocking the shafts, the plate H being adapted to force the material under the folder, substantially as described.

5. The combination in a baling press, of a plunger, means for driving the plunger, a folder for forming the top of the bale, a pair of feeding plates, H, H', rock-shafts for carrying the plates, sprocket wheels, L, L', mounted on the rock-shafts, a sprocket-chain adapted to drive the sprocket wheels in reverse directions, a crank, means for driving the crank, and a pitman actuated by such crank for driving the sprocket-chain, substantially as described and for the purpose set forth.

6. In a baling press the combination with a chambered body having a feed opening, and a plunger adapted to reciprocate within the chamber, of feeding plates, H, H', rock-shafts for carrying the plates and located at the sides of the feed opening whereby the plates are adapted to force the material into the chamber, substantially as described.

7. In a baling press the combination with a chambered body having a feed opening, of feed plates, H, H', rock-shafts for carrying said plates, sprocket wheels, L, L', mounted upon the rock-shafts, a sprocket chain adapted to drive the wheels in opposite directions, a crank, means for driving the crank, and a pitman leading from the crank to the sprocket chain, substantially as described and for the purpose specified.

8. The combination, in a baling press, of a chambered body having a lateral feed opening, a plunger adapted to reciprocate within the body, a pair of feeding plates adapted to oscillate in and out of the feed opening, elliptic gears, a crank pin located upon the longest radius of the driven gear, a pitman for actuating the plunger and attached to the crank pin, a crank arm carried by the shaft of the driven gear and projecting along the line of its longest radius, and a pitman leading from the crank arm and adapted to actuate the feed plates, whereby the plunger and the feed plates vary in speed substantially uniformly.

In testimony whereof I affix my signature in presence of two witnesses.

PLIN C. SOUTHWICK.

Witnesses:
CLARK GRAVES,
G. W. GURLEY.